US011294560B2

(12) United States Patent
Wu

(10) Patent No.: US 11,294,560 B2
(45) Date of Patent: Apr. 5, 2022

(54) METHOD AND APPARATUS FOR CHANGING THE RATIO BETWEEN INTERFACES

(71) Applicant: Huawei Technologies Co., Ltd., Shenzhen (CN)

(72) Inventor: Gang Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 538 days.

(21) Appl. No.: 14/964,810

(22) Filed: Dec. 10, 2015

(65) Prior Publication Data
US 2016/0092064 A1 Mar. 31, 2016

Related U.S. Application Data

(63) Continuation of application No. PCT/CN2014/080410, filed on Jun. 20, 2014.

(51) Int. Cl.
G06F 3/0488 (2013.01)
G06F 3/048 (2013.01)
(Continued)

(52) U.S. Cl.
CPC ............ G06F 3/0488 (2013.01); G06F 3/048 (2013.01); G06F 3/0482 (2013.01); G06F 3/04817 (2013.01); G06F 3/04842 (2013.01)

(58) Field of Classification Search
CPC .... G06F 3/0488; G06F 3/048; G06F 3/04817; G06F 3/0482; G06F 3/04842;
(Continued)

(56) References Cited

U.S. PATENT DOCUMENTS 7,705,833 B2 * 4/2010 Kim .................... G06F 3/04886
345/173
2006/0080386 A1 4/2006 Roykkee et al.
(Continued)

FOREIGN PATENT DOCUMENTS

CN 101042624 A 9/2007
CN 101212752 A 7/2008
(Continued)

OTHER PUBLICATIONS

Kanoya, K., "The Encyclopedia of New Words for Personal Computers," ASCII Corporation, vol. 19, May 1, 1995, 28 pages (with partial translation).
(Continued)

Primary Examiner — Eric J Yoon
(74) Attorney, Agent, or Firm — Slater Matsil, LLP

(57) ABSTRACT

The present disclosure discloses a method and an electronic device for displaying an application interface. The method includes: acquiring, by an electronic device when displaying an interface corresponding to a first application, a first input operation of a user; and simultaneously displaying, according to preset correlation information when the first input operation is a first preset operation, the interface corresponding to the first application and an interface corresponding to a second application, where the correlation information is used to indicate that the second application is an application that correlates with the first application. A corresponding electronic device is further provided. By adopting the present disclosure, interfaces respectively corresponding to multiple applications are simultaneously displayed on a display device, which may enhance user experience.

17 Claims, 13 Drawing Sheets

(51) Int. Cl.
*G06F 3/04817* (2022.01)
*G06F 3/0482* (2013.01)
*G06F 3/04842* (2022.01)

(58) Field of Classification Search
CPC ......... G06F 3/04886; G06F 2203/4803; G06F 3/2203; G06F 3/0481; H04N 5/232935
See application file for complete search history.

(56) References Cited

U.S. PATENT DOCUMENTS

| | | |
|---|---|---|
| 2008/0158189 A1 | 7/2008 | Kim |
| 2010/0081475 A1 | 4/2010 | Chiang et al. |
| 2010/0248788 A1 | 9/2010 | Yook et al. |
| 2010/0293501 A1* | 11/2010 | Russ ................ G06F 3/04886 715/803 |
| 2011/0078624 A1* | 3/2011 | Missig ............... G06F 3/04883 715/802 |
| 2013/0047105 A1 | 2/2013 | Jarrett et al. |
| 2013/0082959 A1 | 4/2013 | Shimazu et al. |
| 2013/0326415 A1 | 12/2013 | Park |
| 2013/0342482 A1 | 12/2013 | Kim et al. |
| 2014/0035174 A1 | 2/2014 | Tatat et al. |
| 2014/0089833 A1* | 3/2014 | Hwang ............... G06F 3/04817 715/769 |
| 2014/0104646 A1 | 4/2014 | Nishiyama |
| 2014/0149923 A1 | 5/2014 | Horiike |
| 2014/0152606 A1 | 6/2014 | Kunitake et al. |
| 2014/0313389 A1* | 10/2014 | Kim ................... H04N 5/23293 348/333.12 |
| 2014/0351748 A1 | 11/2014 | Xia et al. |
| 2015/0160842 A1 | 6/2015 | Yaubuki |

FOREIGN PATENT DOCUMENTS

| | | |
|---|---|---|
| CN | 101685373 A | 3/2010 |
| CN | 102365617 A | 2/2012 |
| CN | 103118197 A | 5/2013 |
| CN | 103324435 A | 9/2013 |
| CN | 103455236 A | 12/2013 |
| CN | 103473027 A | 12/2013 |
| CN | 103514228 A | 1/2014 |
| CN | 103645897 A | 3/2014 |
| EP | 2669784 A1 | 12/2013 |
| EP | 2706438 A2 | 3/2014 |
| EP | 1837748 B1 | 3/2015 |
| JP | 2005202651 A | 7/2005 |
| JP | 2005253003 A | 9/2005 |
| JP | 2006101466 A | 4/2006 |
| JP | 2007257220 A | 10/2007 |
| JP | 2009200697 A | 9/2009 |
| JP | 2012168620 A | 9/2012 |
| JP | 2013050940 A | 3/2013 |
| JP | 2013085236 A | 5/2013 |
| JP | 2013200712 A | 10/2013 |
| JP | 2013239193 A | 11/2013 |
| JP | 2014044454 A | 3/2014 |
| JP | 2014081740 A | 5/2014 |
| JP | 2014106616 A | 6/2014 |
| JP | 2014519111 A | 8/2014 |
| KR | 20120071590 A | 7/2012 |
| KR | 20130045744 A | 5/2013 |
| KR | 20130124360 A | 11/2013 |
| KR | 20130133460 A | 12/2013 |
| KR | 20140000742 A | 1/2014 |
| KR | 20140032767 A | 3/2014 |
| RU | 2363033 C2 | 7/2009 |
| WO | 2012128795 A1 | 9/2012 |
| WO | 2013175751 A1 | 11/2013 |
| WO | 2013183722 A1 | 12/2013 |
| WO | 2013183722 A1 | 2/2016 |

OTHER PUBLICATIONS

Misu, H., "Actual Applications Development on Windows," Unisys Technology Review, Nihon Unisys, Ltd., vol. 15, No. 1, May 31, 1995, 27 pages (with partial translation).

* cited by examiner

US 11,294,560 B2

METHOD AND APPARATUS FOR CHANGING THE RATIO BETWEEN INTERFACES

This application is a continuation of International Application No. PCT/CN2014/080410, filed on Jun. 20, 2014, of which is hereby incorporated by reference in its entirety.

TECHNICAL FIELD

Embodiments of the present invention relate to communications technologies, and in particular, to a method and an apparatus for displaying an application interface, and an electronic device.

BACKGROUND

Because camera photographing quality and screen presentation quality of a mobile phone are increasingly higher, a user is more likely to use the mobile phone to photograph, and view and share photos, and therefore a camera and a photo gallery are more frequently used.

The camera and the photo gallery correlate with each other, that is, the two have a sequential order relationship in operations. In the prior art, operations of a user on a camera and a photo gallery are independent. A connection between the two modules lies in that the camera provides a tapping or sliding entry for entering the photo gallery, so as to view a photo photographed by the user. Therefore, only a function of viewing a photographed photo by the user is satisfied, flexibility of interaction between the modules is poor, and user experience is poor.

SUMMARY

Embodiments of the present invention provide a method and an apparatus for displaying an application interface, and an electronic device, so as to improve flexibility of interaction between applications in an electronic device, and enhance user experience.

According to a first aspect, an embodiment of the present invention provides a method for displaying an application interface, and the method includes:

acquiring, by an electronic device when displaying an interface corresponding to a first application, a first input operation of a user; and simultaneously displaying, according to preset correlation information when the first input operation is a first preset operation, the interface corresponding to the first application and an interface corresponding to a second application, where the correlation information is used to indicate that the second application is an application that correlates with the first application.

With reference to the first aspect, in a first possible implementation manner of the first aspect, when the simultaneously displaying, according to preset correlation information, the interface corresponding to the first application and an interface corresponding to a second application, the method further includes:

receiving a second input operation of the user for the interface corresponding to the second application; and transferring first data determined by the second application according to the second input operation to the first application; or receiving a third input operation of the user for the interface corresponding to the first application; and transferring second data determined by the first application according to the third input operation to the second application.

With reference to the first possible implementation manner of the first aspect, in a second possible implementation manner of the first aspect, after the transferring the first data determined by the second application according to the second input operation to the first application, the method further includes: displaying first information on the interface corresponding to the first application, where the first information is the first data or information related to the first data; or after the transferring the second data determined by the first application according to the third input operation to the second application, the method further includes: displaying second information on the interface corresponding to the second application, where the second information is the second data or information related to the second data.

With reference to the first aspect or the first or the second possible implementation manner of the first aspect, in a third possible implementation manner of the first aspect, the method further includes:

switching, according to the preset correlation information when the first input operation is a second preset operation, a currently displayed interface from the interface corresponding to the first application to the interface corresponding to the second application.

With reference to the first aspect and any one of the first to the third possible implementation manners of the first aspect, in a fourth possible implementation manner of the first aspect, the first input operation is any one or more of the following operations:

a sliding operation, a tapping operation, a multi-touch operation, a button input, a set position input, a touch and hold input, a voice input, and a gravity sensing operation.

With reference to the fourth possible implementation manner of the first aspect, in a fifth possible implementation manner of the first aspect, the first input operation is a first sliding operation, and the simultaneously displaying, according to preset correlation information when the first input operation is a first preset operation, the interface corresponding to the first application and an interface corresponding to a second application includes:

when a sliding speed or sliding distance corresponding to the first sliding operation is less than a first preset value, simultaneously displaying, according to the preset correlation information, the interface corresponding to the first application and the interface corresponding to the second application.

With reference to the fourth possible implementation manner of the first aspect, in a sixth possible implementation manner of the first aspect, the first input operation is the multi-touch operation, and the simultaneously displaying, according to preset correlation information when the first input operation is a first preset operation, the interface corresponding to the first application and an interface corresponding to a second application includes:

when a distance between touch points of the multiple touch points gradually decreases, and a decreased value of a distance between two touch points in the multiple touch points is greater than or equal to a first preset distance value, simultaneously displaying, according to the preset correlation information, the interface corresponding to the first application and the interface corresponding to the second application; or when a distance between touch points of the multiple touch points gradually increases, and an increased value of a distance between two touch points in the multiple touch points is greater than or equal to a second preset distance value, simultaneously displaying, according to the preset correlation information, the interface corresponding to the first application and the interface corresponding to the second application.

With reference to the first aspect and any one of the first to the sixth possible implementation manners of the first aspect, in a seventh possible implementation manner of the first aspect, there are multiple second applications, and the simultaneously displaying, according to preset correlation information when the first input operation is a first preset operation, the interface corresponding to the first application and an interface corresponding to a second application specifically includes:

when the first input operation is the first preset operation, separately displaying, according to the preset correlation information and on the interface corresponding to the first application, an identifier corresponding to each second application in the multiple second applications;

receiving an operation of selecting, by the user, one or more identifiers from identifiers corresponding to the multiple second applications; and simultaneously displaying the interface corresponding to the first application and an interface corresponding to an application identified by the one or more identifiers.

With reference to the first aspect and any one of the first to the seventh possible implementation manners of the first aspect, in an eighth possible implementation manner of the first aspect, the application that correlates with the first application is preset, or is determined according to a history of using the first application and the second application by the user.

According to a second aspect, an embodiment of the present invention provides an apparatus for displaying an application interface, and the apparatus includes:

a display module, configured to display an interface corresponding to a first application;

an acquiring module, configured to acquire a first input operation of a user when the display module displays the interface corresponding to the first application; and a processing module, including a first processing unit, where the first processing unit is configured to instruct, according to preset correlation information when the first input operation is a first preset operation, the display module to simultaneously display the interface corresponding to the first application and an interface corresponding to a second application, and the correlation information is used to indicate that the second application is an application that correlates with the first application.

With reference to the second aspect, in a first possible implementation manner of the second aspect, the acquiring module is further configured to, when the display module simultaneously displays the interface corresponding to the first application and the interface corresponding to the second application, receive a second input operation of the user for the interface corresponding to the second application; and the first processing unit is further configured to transfer first data determined by the second application according to the second input operation to the first application.

With reference to the second aspect, in a second possible implementation manner of the second aspect, the acquiring module is further configured to, when the display module simultaneously displays the interface corresponding to the first application and the interface corresponding to the second application, receive a third input operation of the user for the interface corresponding to the first application; and the first processing unit is further configured to transfer second data determined by the first application according to the third input operation to the second application.

With reference to the first possible implementation manner of the second aspect, in a third possible implementation manner of the second aspect, the processing module further includes:

a second processing unit, configured to, after the first processing unit transfers the first data determined by the second application according to the second input operation to the first application, instruct the display module to display first information on the interface corresponding to the first application, where the first information is the first data or information related to the first data.

With reference to the second possible implementation manner of the second aspect, in a fourth possible implementation manner of the second aspect, the processing module further includes:

a third processing unit, configured to, after the first processing unit transfers the second data determined by the first application according to the third input operation to the second application, instruct the display module to display second information on the interface corresponding to the second application, where the second information is the second data or information related to the second data.

With reference to the second aspect and any one of the first to the fourth possible implementation manners of the second aspect, in a fifth possible implementation manner of the second aspect, the processing module further includes:

a fourth processing unit, configured to instruct, according to the preset correlation information when the first input operation is a second preset operation, the display module to switch a currently displayed interface from the interface corresponding to the first application to the interface corresponding to the second application.

With reference to the second aspect and any one of the first to the fifth possible implementation manners of the second aspect, in a sixth possible implementation manner of the second aspect, the first input operation is any one or more of the following operations:

a sliding operation, a tapping operation, a multi-touch operation, a button input, a set position input, a touch and hold input, a voice input, and a gravity sensing operation.

With reference to the sixth possible implementation manner of the second aspect, in a seventh possible implementation manner of the second aspect, the first input operation is a first sliding operation, and the first processing unit is specifically configured to:

when a sliding speed or sliding distance corresponding to the first sliding operation is less than a first preset value, instruct, according to the preset correlation information, the display module to simultaneously display the interface corresponding to the first application and the interface corresponding to the second application.

With reference to the sixth possible implementation manner of the second aspect, in an eighth possible implementation manner of the second aspect, the first input operation is the multi-touch operation, and the first processing unit is specifically configured to:

when a distance between touch points of the multiple touch points gradually decreases, and a decreased value of a distance between two touch points in the multiple touch points is greater than or equal to a first preset distance value, instruct, according to the preset correlation information, the display module to simultaneously display the interface corresponding to the first application and the interface corresponding to the second application; or when a distance between touch points of the multiple touch points gradually increases, and an increased value of a distance between two touch points in the multiple touch points is greater than or equal to a second preset distance value, instruct, according to the preset correlation information, the display module to simultaneously display the interface corresponding to the first application and the interface corresponding to the second application.

With reference to the second aspect and any one of the first to the eighth possible implementation manners of the second aspect, in a ninth possible implementation manner of the second aspect, there are multiple second applications, and the first processing unit is further configured to:

instruct, according to the preset correlation information when the first input operation is the first preset operation, the display module to separately display, on the interface corresponding to the first application, an identifier corresponding to each second application in the multiple second applications; and after the acquiring module receives an operation of selecting, by the user, one or more identifiers from identifiers corresponding to the multiple second applications, instruct the display module to simultaneously display the interface corresponding to the first application and an interface corresponding to an application identified by the one or more identifiers.

With reference to the second aspect and any one of the first to the ninth possible implementation manners of the second aspect, in a tenth possible implementation manner of the second aspect, the application that correlates with the first application is preset, or is determined according to a history of using the first application and the second application by the user.

According to a third aspect, an embodiment of the present invention provides an electronic device, and the electronic device includes:

an output device, configured to display an interface corresponding to a first application;

an input device, configured to acquire a first input operation of a user when the output device displays the interface corresponding to the first application; and a processor, configured to instruct, according to preset correlation information when the first input operation is a first preset operation, the output device to simultaneously display the interface corresponding to the first application and an interface corresponding to a second application, where the correlation information is used to indicate that the second application is an application that correlates with the first application.

With reference to the third aspect, in a first possible implementation manner of the third aspect, the input device is further configured to, when the output device simultaneously displays the interface corresponding to the first application and the interface corresponding to the second application, receive a second input operation of the user for the interface corresponding to the second application; and the processor is further configured to transfer first data determined by the second application according to the second input operation to the first application.

With reference to the third aspect, in a second possible implementation manner of the third aspect, the input device is further configured to, when the output device simultaneously displays the interface corresponding to the first application and the interface corresponding to the second application, receive a third input operation of the user for the interface corresponding to the first application; and the processor is further configured to transfer second data determined by the first application according to the third input operation to the second application.

With reference to the first possible implementation manner of the third aspect, in a third possible implementation manner of the third aspect, the processor is further configured to:

after transferring the first data determined by the second application according to the second input operation to the first application, instruct the output device to display first information on the interface corresponding to the first application, where the first information is the first data or information related to the first data.

With reference to the second possible implementation manner of the third aspect, in a fourth possible implementation manner of the third aspect, the processor is further configured to:

after transferring the second data determined by the first application according to the third input operation to the second application, instruct the output device to display second information on the interface corresponding to the second application, where the second information is the second data or information related to the second data.

With reference to any one of the third aspect and the first to the fourth possible implementation manners of the third aspect, in a fifth possible implementation manner of the third aspect, the processor is further configured to:

instruct, according to the preset correlation information when the first input operation is a second preset operation, the output device to switch a currently displayed interface from the interface corresponding to the first application to the interface corresponding to the second application.

With reference to the third aspect and any one of the first to the fifth possible implementation manners of the third aspect, in a sixth possible implementation manner of the third aspect, the first input operation is any one or more of the following operations:

a sliding operation, a tapping operation, a multi-touch operation, a button input, a set position input, a touch and hold input, a voice input, and a gravity sensing operation.

With reference to the sixth possible implementation manner of the third aspect, in a seventh possible implementation manner of the third aspect, the first input operation is a first sliding operation; and instructing, by the processor according to the preset correlation information when the first input operation is the first preset operation, the output device to simultaneously display the interface corresponding to the first application and the interface corresponding to the second application is specifically:

when a sliding speed or sliding distance corresponding to the first sliding operation is less than a first preset value, the processor instructs, according to the preset correlation information, the output device to simultaneously display the interface corresponding to the first application and the interface corresponding to the second application.

With reference to the sixth possible implementation manner of the third aspect, in an eighth possible implementation manner of the third aspect, the first input operation is the multi-touch operation; and instructing, by the processor according to the preset correlation information when the first input operation is the first preset operation, the output device to simultaneously display the interface corresponding to the first application and the interface corresponding to the second application is specifically:

when a distance between touch points of the multiple touch points gradually decreases, and a decreased value of a distance between two touch points in the multiple touch points is greater than or equal to a first preset distance value, the processor instructs, according to the preset correlation information, the output device to simultaneously display the interface corresponding to the first application and the interface corresponding to the second application; or when a distance between touch points of the multiple touch points gradually increases, and an increased value of a distance between two touch points in the multiple touch points is greater than or equal to a second preset distance value, the processor instructs, according to the preset correlation information, the output device to simultaneously display the interface corresponding to the first application and the interface corresponding to the second application.

With reference to the third aspect and any one of the first to the eighth possible implementation manners of the third aspect, in a ninth possible implementation manner of the third aspect, instructing, by the processor according to the preset correlation information when the first input operation is the first preset operation, the output device to simultaneously display the interface corresponding to the first application and the interface corresponding to the second application is specifically:

the processor instructs, according to the preset correlation information when the first input operation is the first preset operation, the output device to separately display, on the interface corresponding to the first application, an identifier corresponding to each second application in the multiple second applications; and after the input device receives an operation of selecting, by the user, one or more identifiers from identifiers corresponding to the multiple second applications, the processor instructs, the output device to simultaneously display the interface corresponding to the first application and an interface corresponding to an application identified the one or more identifiers.

With reference to the third aspect and any one of the first to the ninth possible implementation manners of the third aspect, in a tenth possible implementation manner of the third aspect, the application that correlates with the first application is preset, or is determined according to a history of using the first application and the second application by the user.

According to the embodiments of the present invention, on a currently opened application interface, an application presented on a screen is determined according to a first input operation of a user and preset correlation information, and an interface corresponding to the application is displayed, which implements a seamless connection between applications, and improves flexibility of interaction between applications installed in an electronic device. In addition, interfaces respectively corresponding to multiple applications (a first application and/or a second application) are simultaneously displayed on a display device, which may enhance user experience.

BRIEF DESCRIPTION OF THE DRAWINGS

To describe the technical solutions in the embodiments of the present invention more clearly, the following briefly introduces the accompanying drawings required for describing the embodiments.

DETAILED DESCRIPTION OF ILLUSTRATIVE EMBODIMENTS

The following clearly describes the technical solutions in the embodiments of the present invention with reference to the accompanying drawings in the embodiments of the present invention.

According to embodiments of the present invention, to improve flexibility of interaction between applications installed in a device and therefore enhance user experience, another application interface is simultaneously presented on a currently opened application interface, which implements split-screen display of multiple application interfaces. For example, to display interfaces of two applications, that is, a photo gallery and a camera in a device, the other module may be accessed at any time in the two applications; in addition, a split-screen display function of the camera and photo gallery interfaces is also provided, that is, a function of simultaneously performing photographing and picture-viewing operations. In addition, in any embodiment of the present invention, "first" and "second" are merely used to distinguish different applications for ease of description.

Technical solutions of the present invention are described in detail with reference to specific embodiments. The following several specific embodiments may be mutually combined, and for a same or similar concept or process, details may not be described again in some embodiments.

Figure 1:
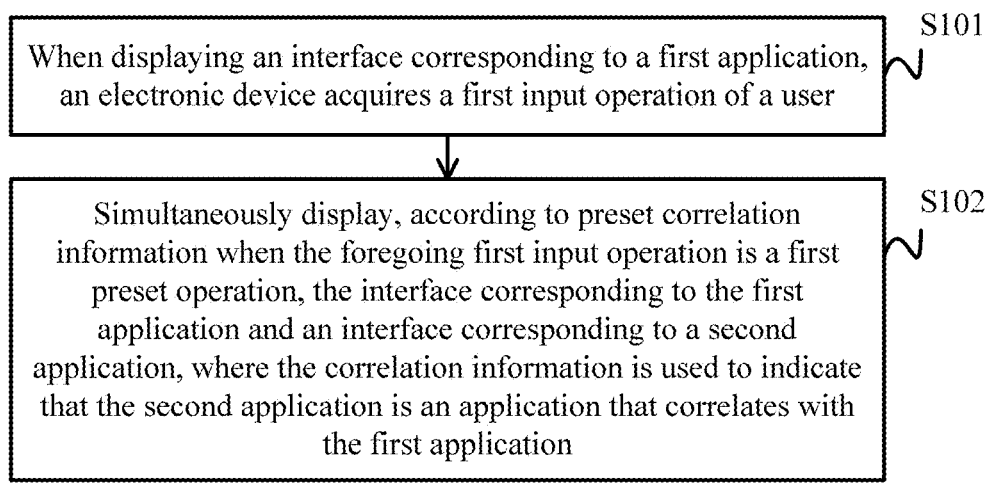
FIG. 1 is a schematic flowchart of embodiment 1 of a method for displaying an application interface according to the present invention.

FIG. 1 is a schematic flowchart of embodiment 1 of a method for displaying an application interface according to the present invention. This embodiment of the present invention provides a method for displaying an application interface, and the method may be executed by using an apparatus for displaying an application interface, where the apparatus is integrated in an electronic device, and the electronic device may be any electronic device such as a personal computer (PC), a notebook computer, a tablet computer, a personal digital assistant (PDA), or a smartphone. As shown in FIG. 1, the method for displaying an application interface includes the following steps:

S101. When displaying an interface corresponding to a first application, the electronic device acquires a first input operation of a user.

The interface corresponding to the first application refers to an interface that is of the first application and displayed on the device; the first input operation may be directly input by the user, for example, a sliding operation, a tapping operation, a multi-touch operation, a button input, a set position input, a touch and hold input, or a voice input, and may also be a response that is made according to an action of the user, for example, a gravity sensing operation such as shaking.

For example, by using a gesture trigger (for example, sliding down from the top of a list) of the user, a framing interface of a camera is introduced into an interface corresponding to a photo gallery. In this scenario, the photo gallery is the first application, the camera is a second application, and the gesture trigger of the user is the acquired first input operation.

S102. Simultaneously display, according to preset correlation information when the foregoing first input operation is a first preset operation, the interface corresponding to the first application and an interface corresponding to a second application, where the correlation information is used to indicate that the second application is an application that correlates with the first application.

There are one or more second applications. Specifically, after S101 in which the first input operation that is input by the user is acquired, S102 in which an interface corresponding to an application is displayed according to the first input operation and the preset correlation information corresponds to three specific scenarios:

The first scenario: The interface corresponding to the first application keeps being presented.

The second scenario: The interface corresponding to the second application is presented.

The third scenario: The interface corresponding to the first application and the interface corresponding to the second application are simultaneously presented.

In addition, in this embodiment, there is a specific connection between the first application and the second application. That is, when using the first application, the user may associate a function of the second application. For example, for contacts and a call, a call and call records, photographing and a photo gallery, a short message service message and an input method, a photo gallery and prompt communication software, and a photo gallery and social networking application software, there is an extremely high probability that the user uses the applications together, and therefore, it is considered that the applications are correlated.

In addition, the application that correlates with the first application is preset, or is determined according to a history of using the first application and the second application by the user. For example, the electronic device records a quantity of times that when performing an operation on the interface corresponding to the first application, the user switches to the interface corresponding to the second application, and then switches back to the interface corresponding to the first application. If the quantity of times is greater than a preset value, for example, five times, the second application is automatically set to be an application correlated with the first application; or the user is prompted whether the user needs to set the second application as an application correlated with the first application, and after permission of the user is obtained, the second application is set as the application correlated with the first application.

According to this embodiment of the present invention, on a currently opened application interface, an application presented on a screen is determined according to a first input operation of a user and preset correlation information, and an interface corresponding to the application is displayed, which implements a seamless connection between applications, and improves flexibility of interaction between applications installed in an electronic device. In addition, interfaces respectively corresponding to multiple applications (a first application and/or a second application) are simultaneously displayed on a display device, which may enhance user experience.

In the embodiment shown in FIG. 1, when the electronic device simultaneously displays, according to the preset correlation information, the interface corresponding to the first application and the interface corresponding to the second application, the method for displaying an application interface may further include: receiving a second input operation of the user for the interface corresponding to the second application, and transferring first data determined by the second application according to the second input operation to the first application; or receiving a third input operation of the user for the interface corresponding to the first application, and transferring second data determined by the first application according to the third input operation to the second application. This embodiment indicates that, when interfaces corresponding to multiple applications are simultaneously displayed, a further operation may be performed on the applications, so as to distinguish multi-task display of an Android™ operating system (Android) from that of an iPhone™ operating system (iOS™). In addition, data may be transferred between multiple applications that are simultaneously displayed, and there is a preset correlation relationship between the multiple applications that are simultaneously displayed, so as to distinguish from a case in which multiple applications are simultaneously displayed on the electronic device by using floating interfaces.

Optionally, after the transferring, by the second application, the first data to the first application according to the second input operation, the method for displaying an application interface may further include: displaying first information on the interface corresponding to the first application, where the first information is the first data or information related to the first data; or after the transferring, by the first application, the second data to the second application according to the third input operation, the method for displaying an application interface may further include: displaying second information on the interface corresponding to the second application, where the second information is the second data or information related to the second data.

On the basis of the foregoing embodiment, the method for displaying an application interface may further include: switching, according to the preset correlation information when the first input operation is a second preset operation, a currently displayed interface from the interface corresponding to the first application to the interface corresponding to the second application. This embodiment indicates that, when the first input operation is not the first preset operation, it is determined that the first input operation is the second preset operation, and the currently displayed interface is switched from the interface corresponding to the first application to the interface corresponding to the second application, which implements switching of application interfaces displayed on a display device, that is, switching from the interface corresponding to the first application to the interface corresponding to the second application.

Further, in the foregoing embodiment, the first input operation may be any one or more of a sliding operation, a tapping operation, a multi-touch operation, a button input, a set position input, a touch and hold input, a voice input, a gravity sensing operation, and the like. The following uses that the first input operation is a sliding operation and a scaling operation of an area between multiple touch points in an interface as an example to describe in detail how to determine and perform interface display according to the first input operation.

In one implementation manner, the sliding operation may include a first sliding operation, and the first input operation may be the first sliding operation. Then, the simultaneously displaying, according to preset correlation information when the first input operation is a first preset operation, the interface corresponding to the first application and an interface corresponding to a second application may include: when a sliding speed or sliding distance corresponding to the first sliding operation is less than a first preset value, simultaneously displaying, according to the preset correlation information, the interface corresponding to the first application and the interface corresponding to the second application; optionally, when the sliding speed or sliding distance corresponding to the first sliding operation is greater than or equal to the first preset value, switching, according to the preset correlation information, a currently displayed interface from the interface corresponding to the first application to the interface corresponding to the second application.

In another implementation manner, the sliding operation may include a second sliding operation, and the second preset operation may be the second sliding operation. Then, when the first input operation is the second preset operation, a currently displayed interface is switched, according to the preset correlation information, from the interface corresponding to the first application to the interface corresponding to the second application.

In still another implementation manner, the first input operation is the multi-touch operation, and the simultaneously displaying, according to preset correlation information when the first input operation is a first preset operation, the interface corresponding to the first application and an interface corresponding to a second application may include: when a distance between touch points of the multiple touch points gradually decreases, and a decreased value of a distance between two touch points in the multiple touch points is greater than or equal to a first preset distance value, simultaneously displaying, according to the preset correlation information, the interface corresponding to the first application and the interface corresponding to the second application; or when a distance between touch points of the multiple touch points gradually increases, and an increased value of a distance between two touch points in the multiple touch points is greater than or equal to a second preset distance value, simultaneously displaying, according to the preset correlation information, the interface corresponding to the first application and the interface corresponding to the second application.

Figure 2:
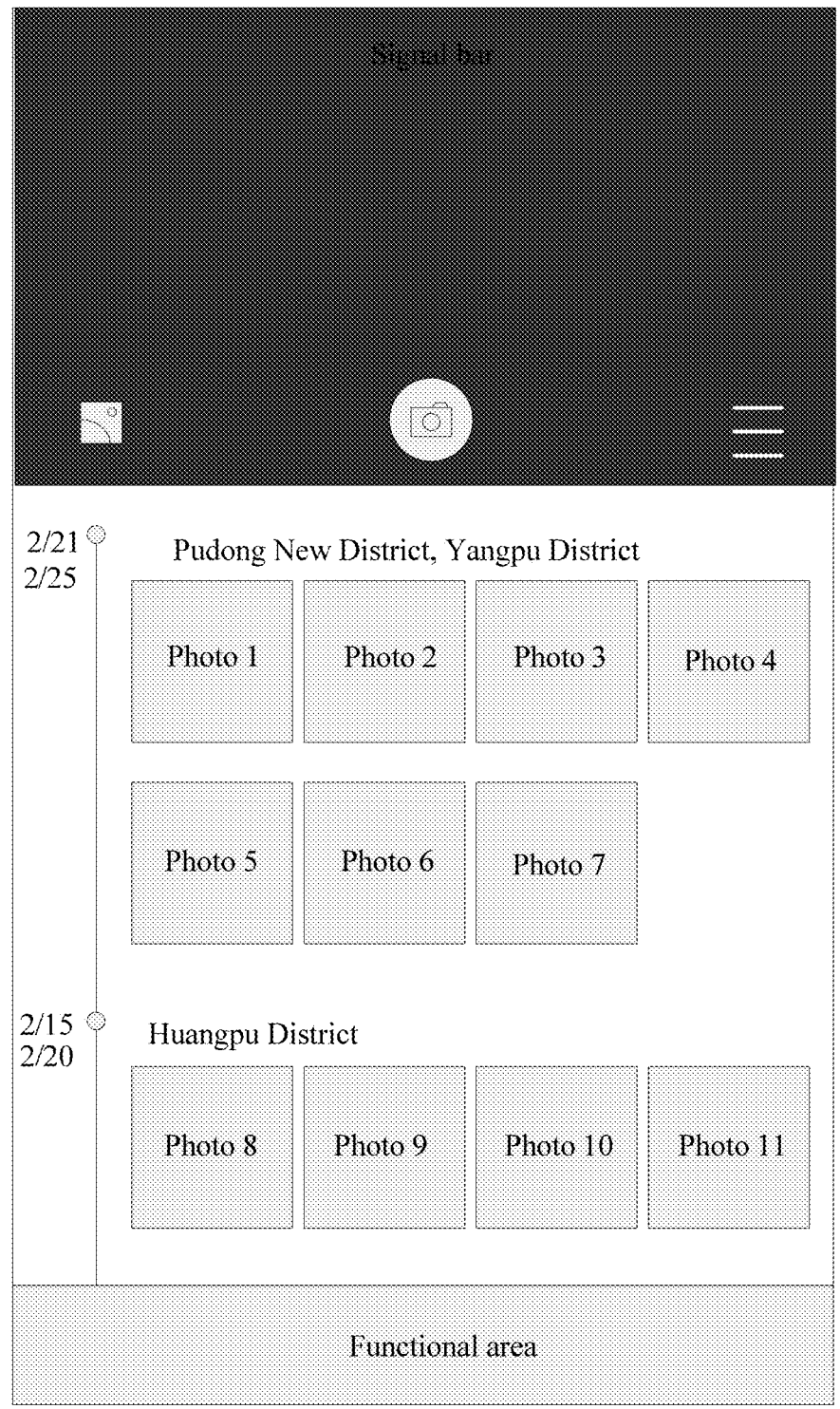
FIG. 2 is an exemplary display diagram of an application interface of embodiment 2 of a method for displaying an application interface according to the present invention.
Figure 3:
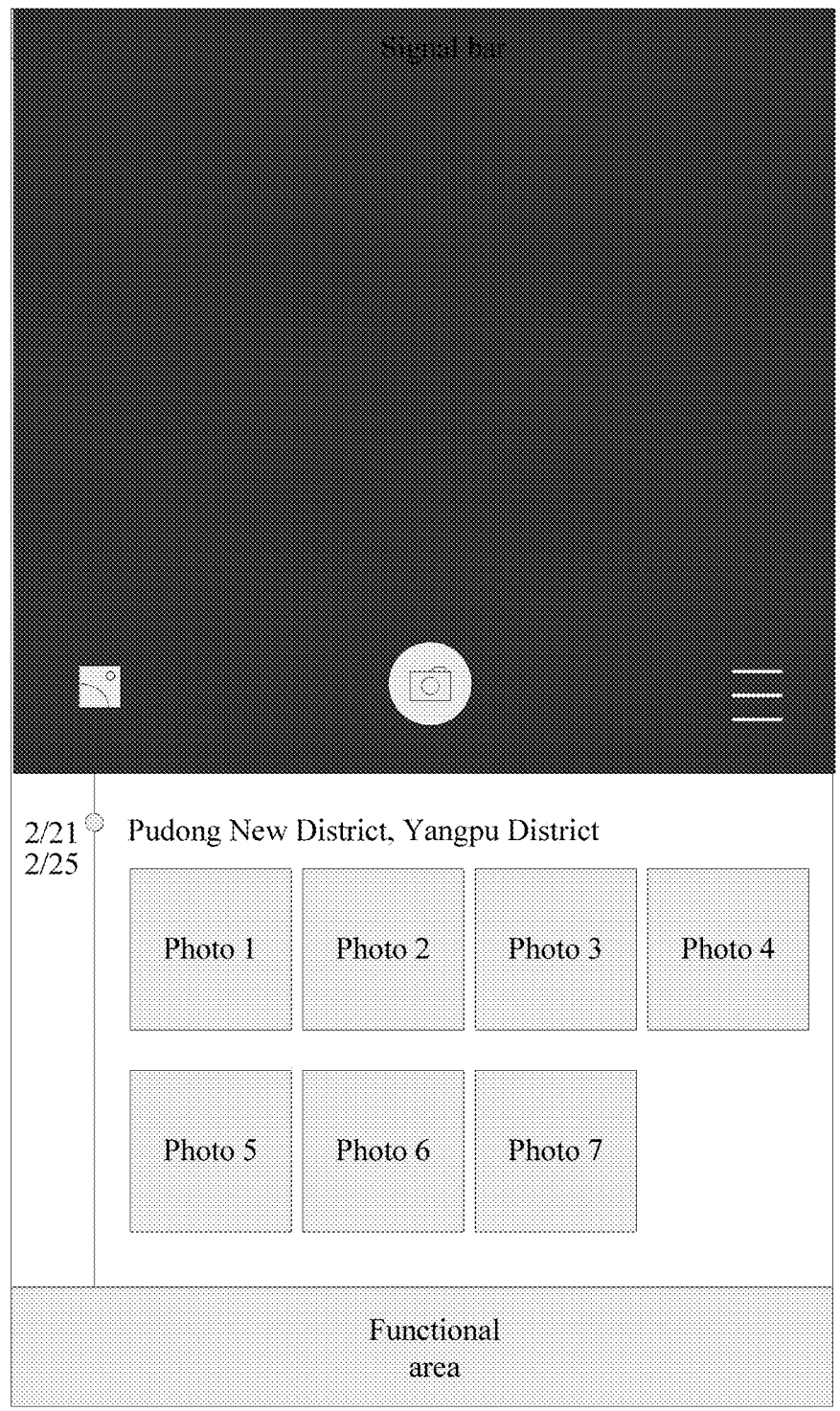
FIG. 3 is an exemplary display diagram of an application interface of embodiment 3 of a method for displaying an application interface according to the present invention.

In the foregoing embodiment of the present invention, for simultaneously displaying the interface corresponding to the first application and the interface corresponding to the second application, a person skilled in the art may understand it as: displaying the interface corresponding to the first application and the interface corresponding to the second application on a display device in a split-screen manner. Split screens of the interface corresponding to the first application and the interface corresponding to the second application on the display device (for example, a screen) are in any ratio. For example, as shown in FIG. 2 and FIG. 3, a photo gallery is used as the first application, and a camera is used as the second application. A split-screen ratio between interfaces corresponding to the two applications on a screen is variable, and a user may set the ratio according to personal preference in real time.

Figure 4:
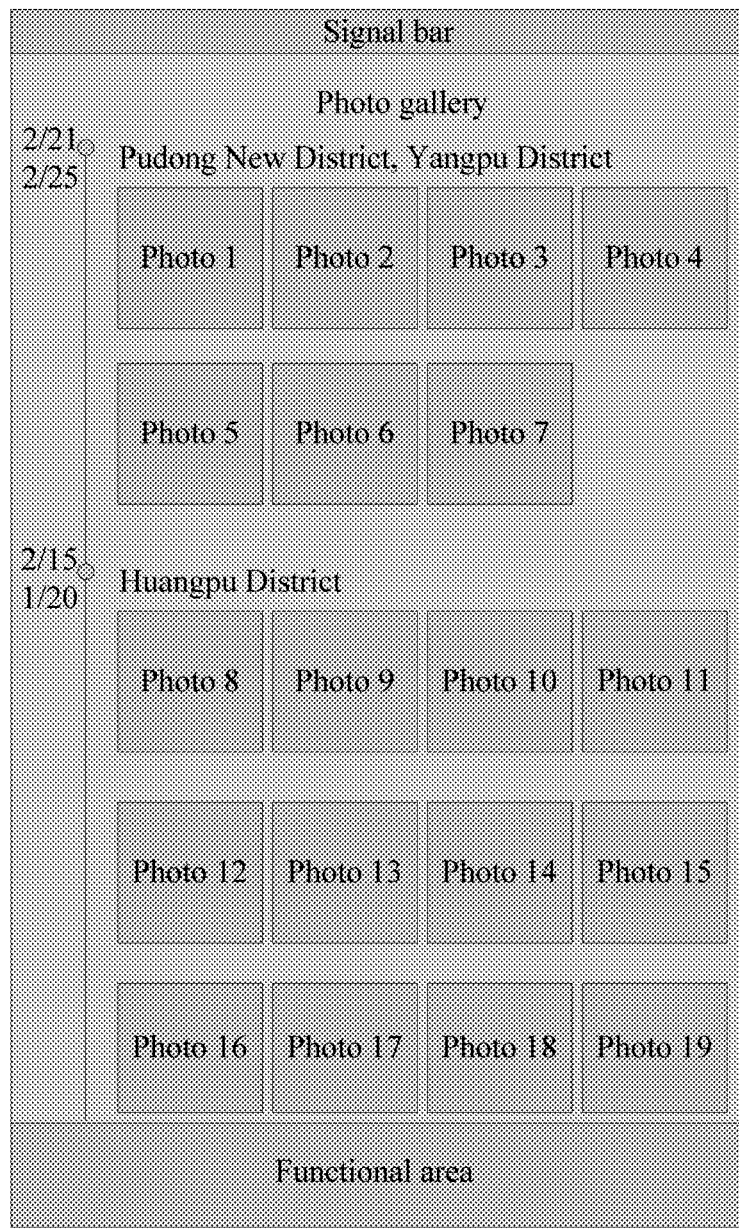
FIG. 4 is an exemplary diagram of an interface corresponding to a photo gallery.
Figure 5:
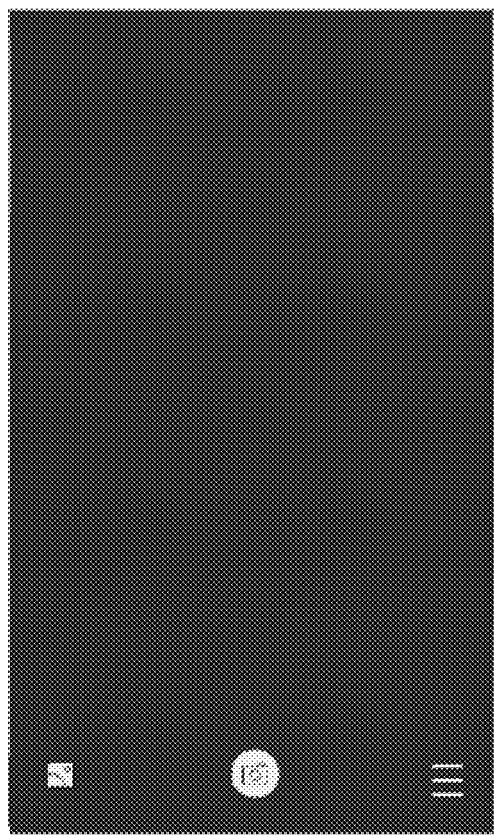
FIG. 5 is an exemplary diagram of an interface corresponding to a camera.

More specifically, in an interface corresponding to the photo gallery (the first application) shown in FIG. 4, a sliding-down operation (the first sliding operation) is detected; when a sliding-down speed corresponding to the sliding-down operation is less than the first preset value, the interface corresponding to the photo gallery and an interface corresponding to the camera (the second application) are simultaneously displayed according to preset correlation information, and the interface corresponding to the photo gallery and the interface corresponding to the camera are presented in a split-screen manner, as shown in FIG. 2 or FIG. 3. In addition, when a user photographs on a framing interface of the camera, a photo may be fed back in real time in a photo gallery preview area at the bottom, and the user is allowed to tap a picture in the photo gallery to view a big picture. If a sliding-down speed corresponding to the sliding-down operation is greater than or equal to the first preset value, it is determined that the first input operation is the second preset operation, and a currently displayed interface is switched, according to the preset correlation information, from the interface corresponding to the photo gallery to the interface corresponding to the camera, and the interface corresponding to the camera is presented, as shown in FIG. 5. A size of the interface corresponding to the camera on the screen may determine an image size of a picture to be photographed. In this embodiment, the user may access the camera interface by means of an operation of sliding up or down on the photo gallery interface, and perform a corresponding photographing function. Similarly, the user may access the photo gallery interface by means of an operation of sliding up or down on the camera interface, and perform a corresponding picture-viewing function. Full integration of the two applications, that is, the camera and the photo gallery, implements overall seamless connection experience for the user. Simultaneously displaying the photo gallery interface and a regional photographing interface may implement that the user quickly photographs or shoots, and experiences an effect that what you see is what you get in the photo gallery; and functions of viewing a picture in the photo gallery and regional photographing are implemented by sliding on the camera interface. Entering different photo gallery interfaces may be triggered by performing different sliding operations on the camera interface; for example, accessing a photo gallery interface in a full-screen picture mode may be triggered by performing a sliding-left operation on the camera interface, and accessing the regional photographing interface or the photo gallery interface may be triggered by performing a sliding-up operation on the camera interface.

For another example, in the interface corresponding to the photo gallery shown in FIG. 4, a pulling-down operation (the first sliding operation) is detected. If a sliding distance corresponding to the pulling-down operation is less than the first preset value, the interface corresponding to the photo gallery and the interface corresponding to the camera are simultaneously displayed according to the preset correlation information, and the interface corresponding to the photo gallery and the interface corresponding to the camera are presented in a split-screen manner, as shown in FIG. 2 or FIG. 3. If a sliding-down speed corresponding to the sliding-down operation is greater than or equal to the first preset value, a currently displayed interface is switched, according to the preset correlation information, from the interface corresponding to the photo gallery application to the interface corresponding to the camera, and the interface corresponding to the camera is presented, as shown in FIG. 5. Likewise, the user may also slide up to return to an interface on which photographing and the photo gallery coexist from a full-screen framing interface of the camera, which is merely used as an example for description, and another scenario may be analogized according to this.

Figure 6:
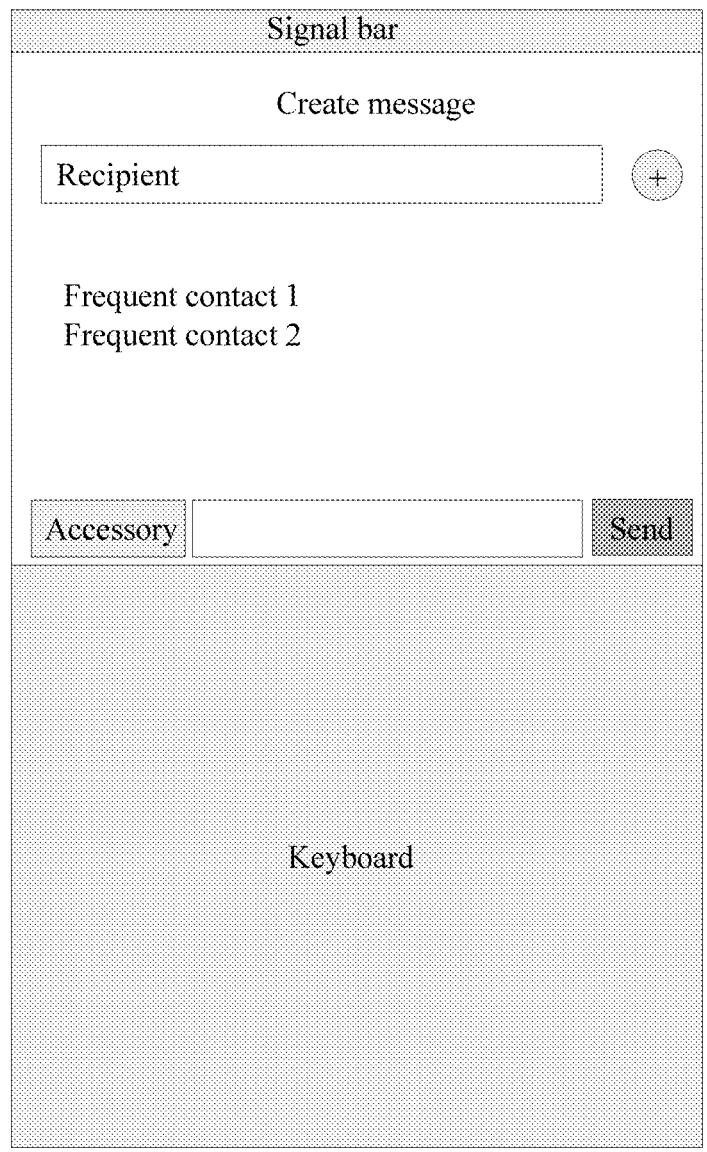
FIG. 6 is an exemplary diagram of an interface corresponding to a short message service message.
Figure 7:
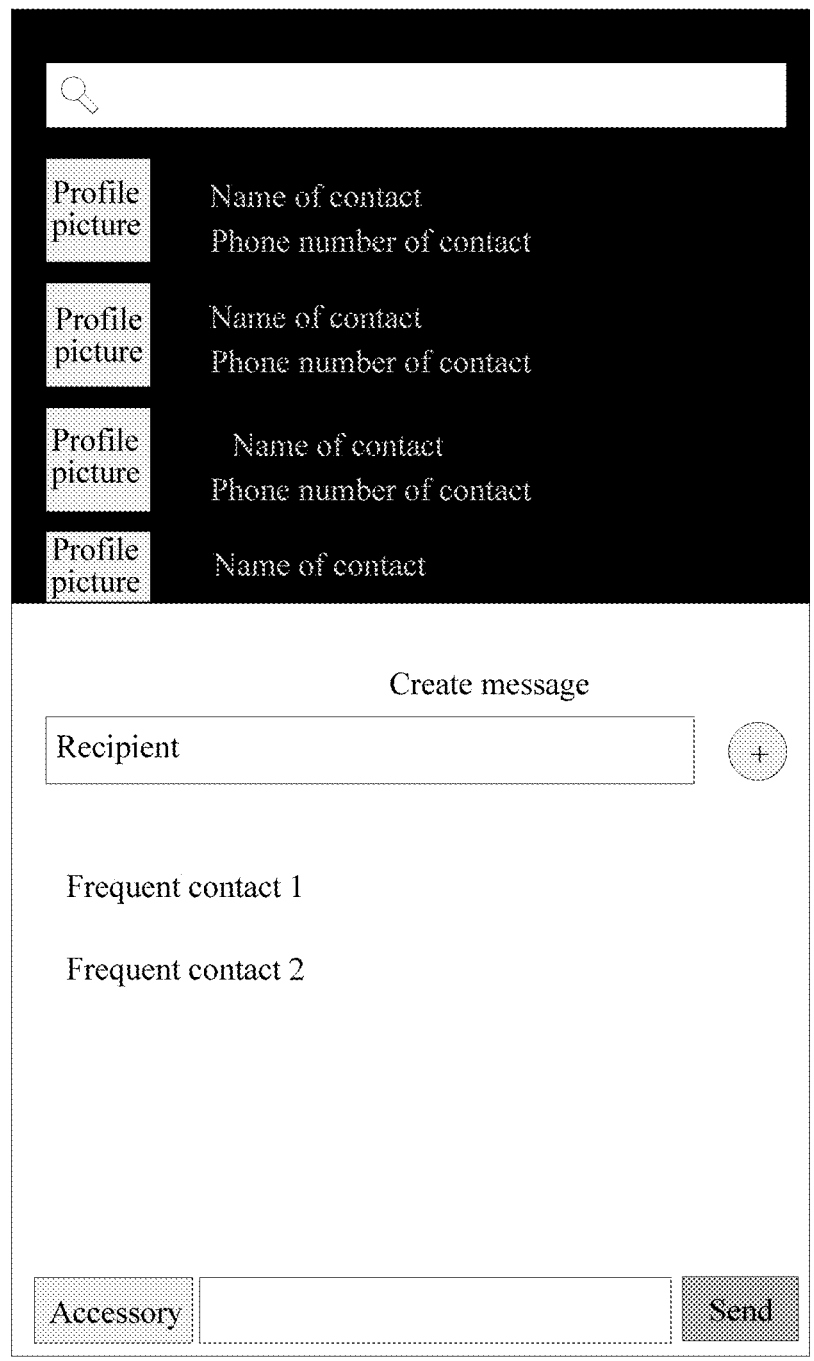
FIG. 7 is an exemplary diagram of embedding contacts into a short message service message in embodiment 4 of a method for displaying an application interface according to the present invention.
Figure 8:
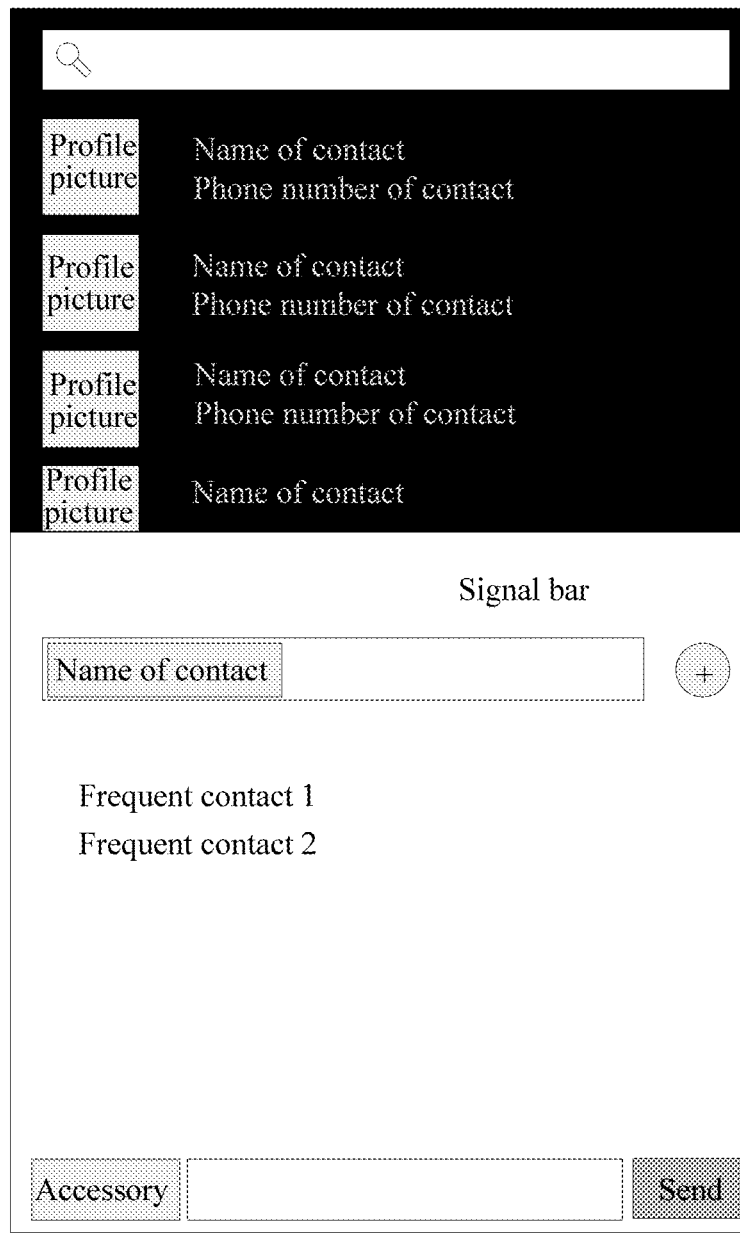
FIG. 8 is an exemplary display diagram of an application interface of embodiment 4 of the method for displaying an application interface according to the present invention.
Figure 9:
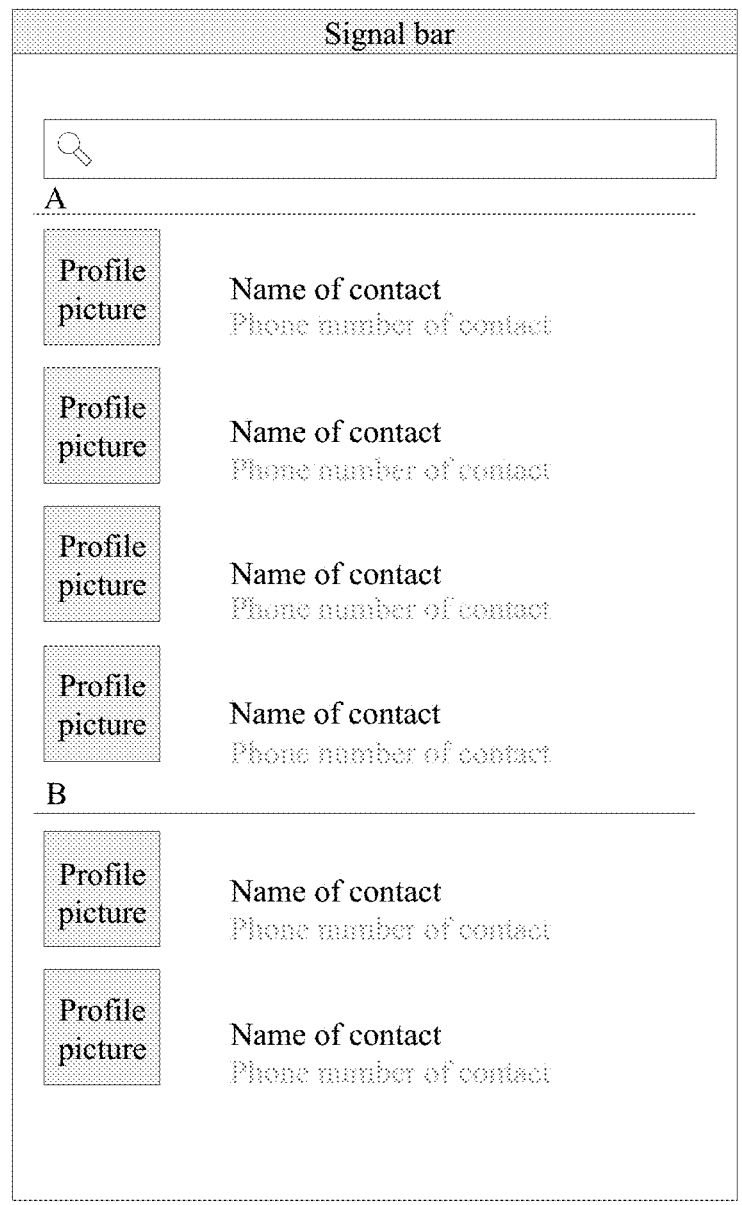
FIG. 9 is an exemplary diagram of an interface corresponding to contacts.

On the basis of the foregoing embodiment, a same operation manner may be extended to another application scenario, for example, a short message service message and contacts, a browser and favorites, dials and contacts, or call records and contacts. In an application scenario of the short message service message and contacts, the user may embed contacts (as shown in FIG. 7) into an interface of creating a short message service message (as shown in FIG. 6) by pulling down the interface, and a selected contact may be directly added into a recipient area (as shown in FIG. 8), and so on, which are not described herein again.

Optionally, there are multiple second applications, and S102, that is, the simultaneously displaying, according to preset correlation information when the first input operation is a first preset operation, the interface corresponding to the first application and an interface corresponding to a second application may specifically include: when the first input operation is the first preset operation, separately displaying, according to the preset correlation information and on the interface corresponding to the first application, an identifier corresponding to each second application in the multiple second applications; receiving an operation of selecting, by the user, one or more identifiers from the multiple second applications; and using one or more applications selected by the operation as applications to be displayed in a split-screen manner with the first application, and simultaneously displaying the interface corresponding to the first application and an interface corresponding to an application identified by the foregoing one or more identifiers. The second application that correlates with the first application is preset, or is determined according to a history of using the first application and the second application by the user.

Figure 10:
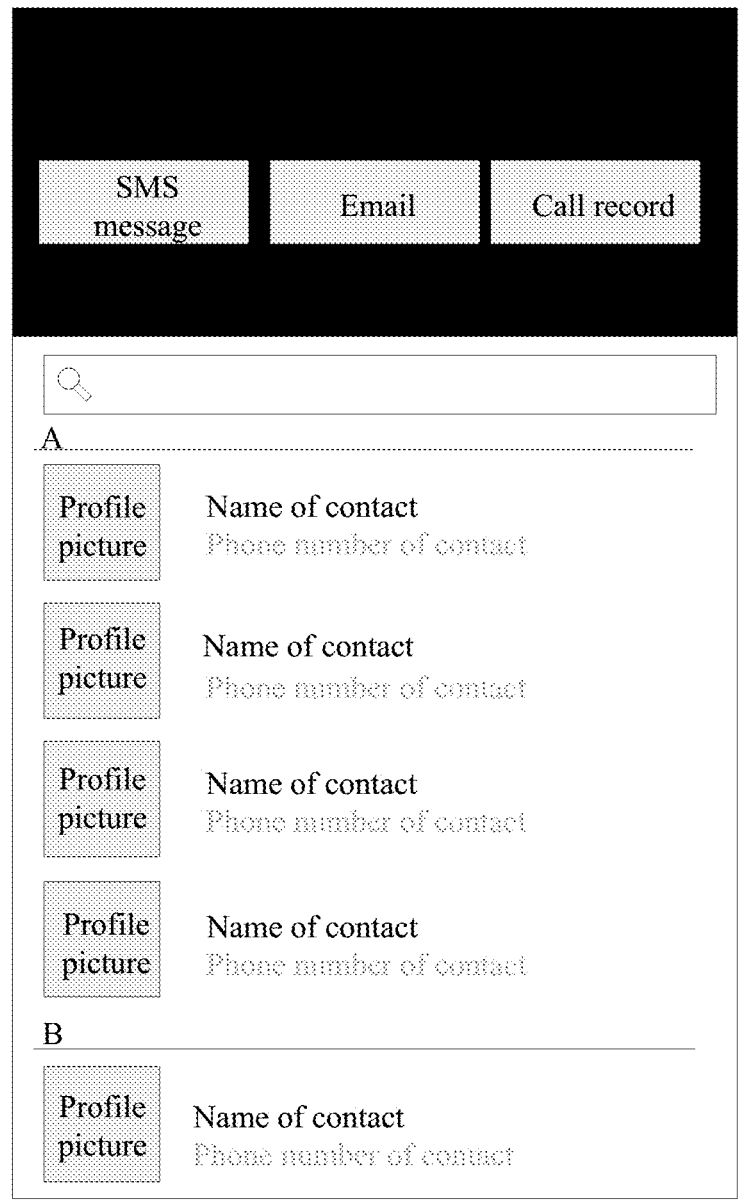
FIG. 10 is an exemplary diagram of other optional applications that correlate with contacts in embodiment 5 of a method for displaying an application interface according to the present invention.

In this embodiment, the first application correlates with multiple second applications. For example, when pulling down in the interface corresponding to the first application, second applications that need to be correlated may be selected; and after being selected, the second applications are simultaneously displayed with the interface corresponding to the first application. Specifically, as shown in FIG. 9 to FIG. 12, FIG. 9 shows an interface corresponding to contacts (that is, the first application). FIG. 10 shows other optional applications (that is, the second applications) that correlate with the contacts, and examples herein are short message services messages, emails, and call records. As shown in FIG. 10, when a device that displays the contact interface shown in FIG. 9 receives the first input operation, a second application that correlates with the contact application is displayed.

Figure 11:
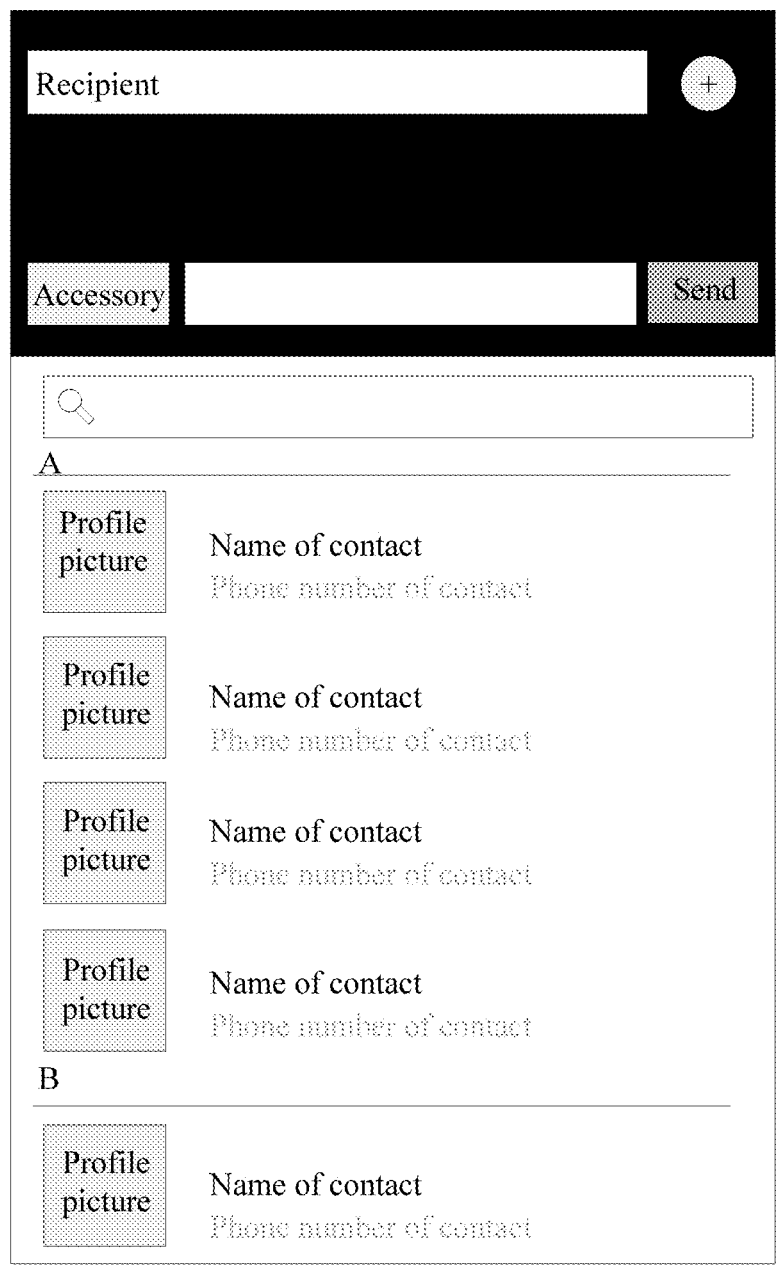
FIG. 11 is an exemplary diagram of embedding a short message service message interface into a contact interface in embodiment 5 of the method for displaying an application interface according to the present invention.
Figure 12:
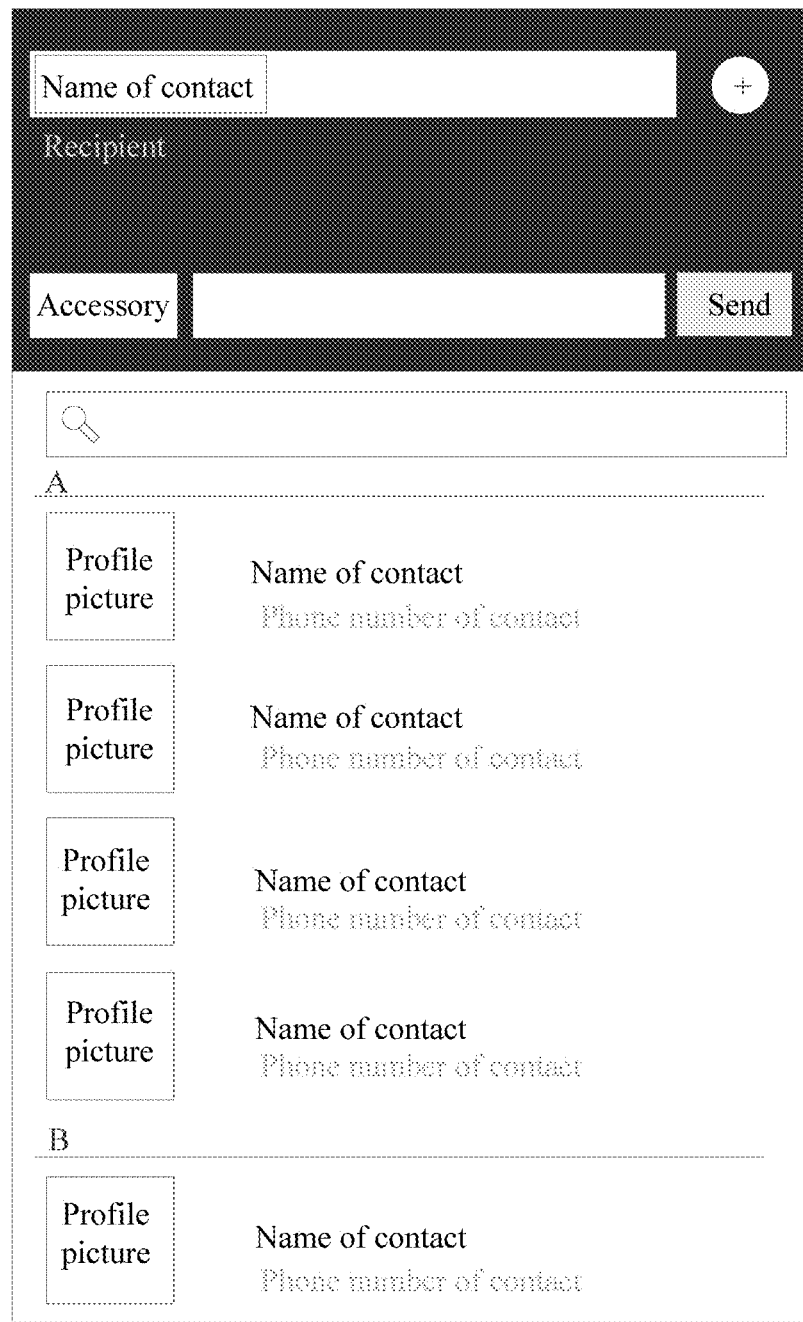
FIG. 12 is an exemplary display diagram of an application interface of embodiment 5 of the method for displaying an application interface according to the present invention.

FIG. 11 is a diagram of simultaneously displaying a contact interface and a short message service message interface; FIG. 12 shows that a contact name in the contact interface is selected to be added into a recipient area shown in FIG. 11, which implements integration of the contact interface and the short message service message interface.

Figure 13:
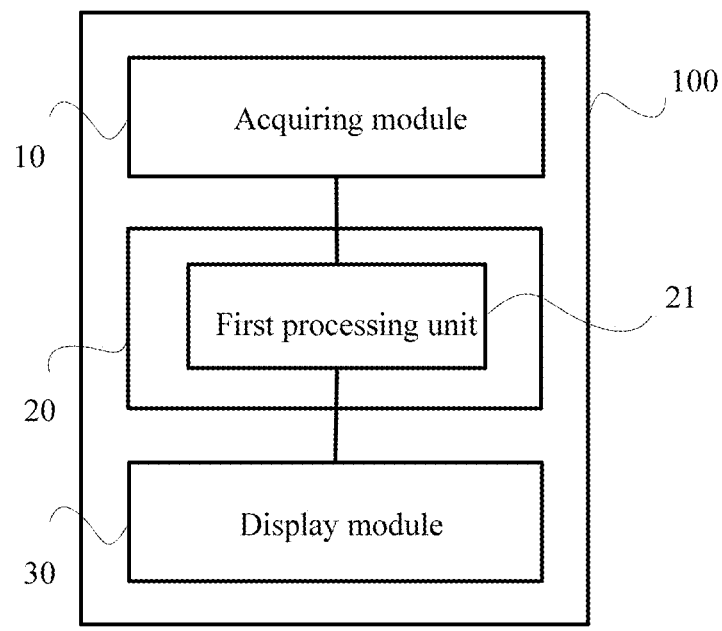
FIG. 13 is a schematic structural diagram of embodiment 1 of an apparatus for displaying an application interface according to the present invention.

FIG. 13 is a schematic structural diagram of embodiment 1 of an apparatus for displaying an application interface according to the present invention. This embodiment of the present invention provides an apparatus 100 for displaying an application interface, and the apparatus is integrated in an electronic device, where the electronic device may be any electronic device such as a PC, a notebook computer, a tablet computer, a PDA, or a smartphone. As shown in FIG. 13, the apparatus 100 for displaying an application interface includes an acquiring module 10, a processing module 20, and a display module 30.

The display module 30 is configured to display an interface corresponding to a first application; the acquiring module 10 is configured to acquire a first input operation of a user when the display module 30 displays the interface corresponding to the first application; and the processing module 20 includes a first processing unit 21, where the first processing unit 21 is configured to instruct, according to preset correlation information when the first input operation acquired by the acquiring module 10 is a first preset operation, the display module 30 to simultaneously display the interface corresponding to the first application and an interface corresponding to a second application, and the correlation information is used to indicate that the second application is an application that correlates with the first application.

For example, in this embodiment of the present invention, the acquiring module 10 may be a touchscreen of an electronic device, and the touchscreen can detect sliding and tapping actions applied thereto; the processing module 20 converts the foregoing sliding and tapping actions into corresponding digital signals, and provides the digital signals to an application (for example, the first application and/or the second application), so that the application implements a corresponding function. In addition, the processing module may further detect a direction and a speed of a sliding action, and return specific values corresponding to the direction and the speed to the application, so that the application performs different interface processing.

In addition, an electronic device that integrates the apparatus 100 for displaying an application interface includes a storage module, and the storage module is configured to store current applications such as a camera and a photo gallery, and display states of interfaces of the current applications, so that a current state may further be restored in a case in which display of an application interface is interrupted.

The apparatus for displaying an application interface in this embodiment of the present invention may implement the technical solution in the method embodiment shown in FIG. 1, and implementation principles and technical effects of the apparatus are similar and are not described herein again.

In the foregoing embodiment, the acquiring module 10 may be further configured to, when the display module 30 simultaneously displays the interface corresponding to the first application and the interface corresponding to the second application, receive a second input operation of the user for the interface corresponding to the second application. In this case, the first processing unit 21 may be further configured to transfer first data determined by the second application according to the second input operation to the first application.

Optionally, the acquiring module 10 may be further configured to, when the display module 30 simultaneously displays the interface corresponding to the first application and the interface corresponding to the second application, receive a third input operation of the user for the interface corresponding to the first application. In this scenario, the first processing unit 21 may be further configured to transfer second data determined by the first application according to the third input operation to the second application.

Further, the processing module 20 may further include a second processing unit. The second processing unit may be configured to, after the first processing unit 21 transfers the first data determined by the second application according to the second input operation to the first application, instruct the display module 30 to display first information on the interface corresponding to the first application, where the first information is the first data or information related to the first data.

The processing module 20 may further include a third processing unit. The third processing unit is configured to, after the first processing unit 21 transfers the second data determined by the first application according to the third input operation to the second application, instruct the display module 30 to display second information on the interface corresponding to the second application, where the second information is the second data or information related to the second data.

On the basis of the above, the processing module 20 may further include a fourth processing unit. The fourth processing unit is configured to instruct, according to the preset correlation information when the first input operation is a second preset operation, the display module 30 to switch a currently displayed interface from the interface corresponding to the first application to the interface corresponding to the second application.

In any embodiment of the present invention, the first input operation may be any one or more of the following operations: a sliding operation, a tapping operation, a multi-touch operation, a button input, a set position input, a touch and hold input, a voice input, a gravity sensing operation, and the like.

In one implementation manner, the first input operation is a first sliding operation, and the first processing unit 21 may be specifically configured to: when a sliding speed or sliding distance corresponding to the first sliding operation is less than a first preset value, instruct, according to the preset correlation information, the display module 30 to simultaneously display the interface corresponding to the first application and the interface corresponding to the second application.

In another implementation manner, the sliding operation may include a second sliding operation, and the second preset operation may be the second sliding operation. Then, the first processing unit 21 may be specifically configured to instruct, according to the preset correlation information when the first input operation is the second preset operation, the display module 30 to switch a currently displayed interface from the interface corresponding to the first application to the interface corresponding to the second application.

In still another implementation manner, the first input operation is the multi-touch operation, and the first processing unit 21 may be specifically configured to: when a distance between touch points of the multiple touch points gradually decreases, and a decreased value of a distance between two touch points in the multiple touch points is greater than or equal to a first preset distance value, instruct, according to the preset correlation information, the display module 30 to simultaneously display the interface corresponding to the first application and the interface corresponding to the second application; or when a distance between touch points of the multiple touch points gradually increases, and an increased value of a distance between two touch points in the multiple touch points is greater than or equal to a second preset distance value, instruct, according to the preset correlation information, the display module 30 to simultaneously display the interface corresponding to the first application and the interface corresponding to the second application.

Furthermore, there are multiple second applications, and the first processing unit 21 may be further configured to: instruct, according to the preset correlation information when the first input operation is the first preset operation, the display module 30 to separately display, on the interface corresponding to the first application, an identifier corresponding to each second application in the multiple second applications; and after the acquiring module 10 receives an operation of selecting, by the user, one or more identifiers from the multiple second applications, instruct the display module 30 to simultaneously display the interface corresponding to the first application and an interface corresponding to an application identified by the one or more identifiers. The second application that correlates with the first application is preset, or is determined according to a history of using the first application and the second application by the user; or may also be determined in another manner, which is not described herein again.

Figure 14:
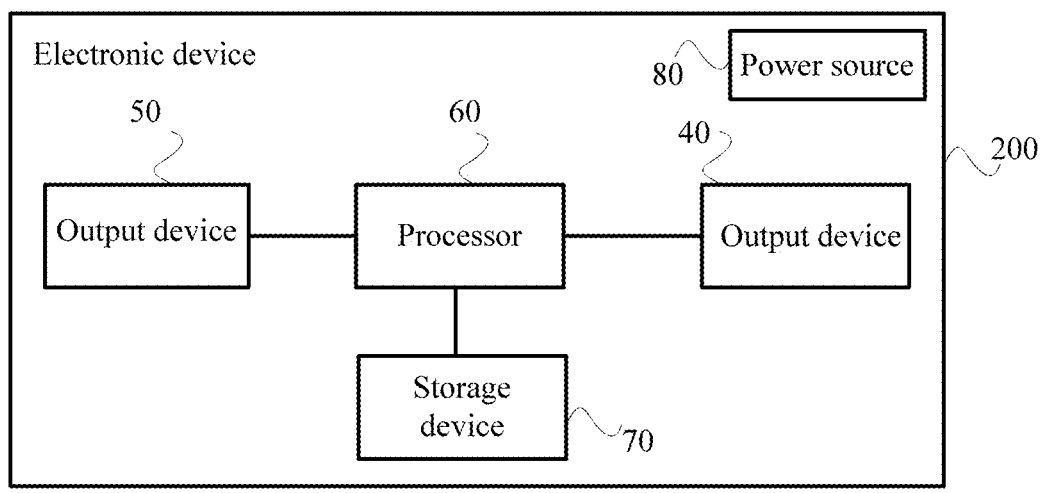
FIG. 14 is a schematic structural diagram of embodiment 1 of an electronic device according to the present invention.

FIG. 14 is a schematic structural diagram of embodiment 1 of an electronic device according to the present invention. As shown in FIG. 14, an electronic device 200 includes components such as an output device 40, an input device 50, a processor 60, a storage device 70, and power source 80. These components perform communication by using one or more buses. A person skilled in the art may understand that the structure of the electronic device 200 shown in the figure does not constitute a limitation on the present invention. The structure may not only be a bus structure, or may be a star structure, or may further include more or fewer components than those shown in the figure, or combine some parts, or have different parts arrangements. In this embodiment of the present invention, the electronic device 200 may be any mobile or portable electronic device, and includes but is not limited to a mobile phone, a mobile computer, a tablet computer, a PDA, a media player, a smart television, a combination of the foregoing two or more items, and the like.

When a user uses the electronic device 200, the input device 50 receives information or a user input; the storage device 70 stores corresponding code, and configuration data or user data related to a processing process; and the processor 60 runs the corresponding code, and processes received information, so as to generate and output a corresponding interface and data, which are finally presented to the user by the output device 40.

Specifically, the output device 40 is configured to display an interface corresponding to a first application; the input device 50 is configured to acquire a first input operation of a user when the output device 40 displays the interface corresponding to the first application; and the processor 60 is configured to instruct, according to preset correlation information when the first input operation is a first preset operation, the output device 40 to simultaneously display the interface corresponding to the first application and an interface corresponding to a second application, where the correlation information is used to indicate that the second application is an application that correlates with the first application.

It should be noted that the input device 50 is configured to implement interaction between the user and the electronic device 200 and/or input of information into the electronic device 200. For example, the input device 50 may receive digit or character information that is entered by the user, so as to generate a signal input related to user setting or function control. In a specific embodiment of the present invention, the input device 50 may be a touch panel, or may be another human-machine interaction interface, for example, a substantive input key and a microphone; or may be another apparatus for acquiring external information, for example, a camera. The touch panel, which is also referred to as a touchscreen, may collect an operation action of touching or approaching, for example, an operation action performed by the user on the touch panel or at a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to the processor 60. The touch controller may further receive and run a command sent from the processor 60. In addition, the touch panel may be implemented in multiple types, such as a resistive type, a capacitive type, an infrared (Infrared) ray, and a surface acoustic wave. In another embodiment of the present invention, the substantive input key used by the input device 50 may include but is not limited to one or more of a physical keyboard, a functional key (such as a volume control key or a power key), a trackball, a mouse, a joystick, and the like. An input device 50 in a form of a microphone may collect a voice that is input by the user or an environment, and convert the voice into a command that is in a form of an electric signal and may be run by the processor 60.

In other embodiments of the present invention, the input device 50 may also be a sensing component in various types, for example, a Hall component, which is configured to detect a physical quantity of the electronic device, such as a force, a torque, a pressure, a stress, a position, a displacement, a speed, acceleration, an angle, an angular velocity, a quantity of revolutions, a rotational speed, and a time at which a working state changes, and converts the physical quantity into an electric quantity to perform detection and control. Other sensing components may further include a gravity sensor, a tri-axis accelerometer, a gyroscope, or the like.

The processor 60 is a control center of the electronic device 200 and is connected to various parts of the entire electronic device 200 by using various interfaces and lines; implements various functions of the electronic device 200 and/or processes data by running or executing a software program and/or module stored in the storage device 70 and invoking data stored in the storage device 70. The processor 60 may be comprised of an integrated circuit (IC), for example, may be comprised of a single packaged IC, and may also be comprised of multiple packaged ICs that are connected and with a same function or different functions. For example, the processor 60 may include only a central processing unit (CPU), or may be a combination of a graphics processing unit (GPU), a digital signal processor (DSP), and a control chip (for example, a baseband chip) in a communications unit. In this embodiment of the present invention, the CPU may be a single computing core, or may include multiple computing cores.

The output device 40 includes but is not limited to an image output device and a sound output device. The image output device is configured to output a character, a picture, and/or a video. The image output device may include a display panel, for example, a display panel configured in a form of a liquid crystal display (LCD), an organic light-emitting diode (OLED), a field emission display (FED), and the like; or the image output device may include a reflective display, for example, an electrophoretic (electrophoretic) display or a display using an interferometric modulation of light technology. The image output device may include a single display or multiple displays in different sizes. In a specific embodiment of the present invention, the touch panel used by the foregoing input device 50 may also be used as the display panel of the output device 40. For example, after detecting a gesture operation of touching or approaching on the touch panel, the touch panel transmits the gesture operation to the processor 60 to determine a type of a touch event, and then the processor 60 provides a corresponding visual output on the display panel according to the type of the touch event. In FIG. 14, though the input device 50 and the output device 40 are used as two independent parts to implement input and output functions of the electronic device 200, in some embodiments, the touch panel and the display panel may be integrated to implement the input and output functions of the electronic device. For example, the image output device may display various graphical user interfaces (GUI), so as to use the graphical user interfaces as virtual control components, and the graphical user interfaces include but are not limited to a window, a scrollbar, an icon, and a clipboard, so that a user operates in a touch manner.

In a specific embodiment of the present invention, the image output device includes a filter and an amplifier that are configured to filter and amplify a video that is output by the processor 60. An audio output device includes a digital analog converter, which is configured to convert an audio signal that is output by the processor 60 from a digital format to an analog format.

The storage device 70 may be configured to store a software program and a module, and the processor 60 executes various functional applications of the electronic device 200 and implements data processing by running the software program and the module that are stored in the storage device 70. The storage device 70 mainly includes a program storage area and a data storage area. The program storage area may store an operating system, and an application program such as a sound playing program or an image playing program that is required by at least one function; and the data storage area may store data (such as audio data or a phone book) that is created according to use of the electronic device 200, and the like. In a specific embodiment of the present invention, the storage device 70 may include a volatile memory, for example, a nonvolatile dynamic random access memory (NVRAM), a phase change random access memory (PRAM), or a magnetoresistive random access memory (MRAM); and may further include a nonvolatile memory, for example, at least one disk storage component, an electrically erasable programmable read-only memory (EEPROM), or a flash memory component such as a NOR flash memory or a NAND flash memory. The non-volatile memory stores an operating system and an application program that are executed by the processor 60. The processor 60 loads, from the non-volatile memory, a running program and data to a memory, and stores digital content in a large number of storage apparatuses. The operating system includes various components and/or drivers that are configured to control and manage regular system tasks such as memory management, control of the storage device 70, and power management, and facilitate communications between various software and hardware. In this embodiment of the present invention, the operating system may be an Android operating system of the Google™ company, an iOS operating system developed by the Apple™ company, a Windows™ operating system developed by the Microsoft™ company, or the like; or an embedded operating system such as Vxworks™.

The application program includes any application installed on the electronic device 200, and includes but is not limited to a browser, an email, an instant messaging service, word processing, a virtual keyboard, a window widget (Widget), encryption, digital rights management, voice recognition, voice duplication, positioning (such as a function provided by the Global Positioning System), music playback, and the like.

The power source 80 is configured to supply power to various parts of the electronic device 200 to maintain their running. Generally, the power source 80 may be a built-in battery, for example, a common lithium-ion battery or a nickel-hydride battery; or may include an external power source that directly supplies power to the electronic device, for example, an AC adapter. In some embodiments of the present invention, the power source 80 may be defined in a wider scope; for example, may include a power management system, a charging system, a power failure detection circuit, a power converter or inverter, a power status indicator (such as a light emitting diode), and any other components related to power generation, management, and distribution of the electronic device 200.

The electronic device in this embodiment of the present invention may execute the technical solution of the method embodiment shown in FIG. 1. The implementation principles and technical effects are similar, and are not described herein again.

It should be noted that, there is at least one second application; in addition, a first input operation may be any one or more of the following operations: a sliding operation, a tapping operation, a multi-touch operation, a button input, a set position input, a touch and hold input, a voice input, and a gravity sensing operation.

In the foregoing embodiment, the input device 50 may be further configured to, when the output device 40 simultaneously displays the interface corresponding to the first application and the interface corresponding to the second application, receive a second input operation of the user for the interface corresponding to the second application. Optionally, the processor 60 may be further configured to transfer first data determined by the second application according to the second input operation to the first application.

In the foregoing embodiment, the input device 50 may be further configured to, when the output device 40 simultaneously displays the interface corresponding to the first application and the interface corresponding to the second application, receive a third input operation of the user for the interface corresponding to the first application. Optionally, the processor 60 may be further configured to transfer second data determined by the first application according to the third input operation to the second application.

On the basis of the foregoing embodiment, in a specific implementation manner, the processor 60 may be further configured to: after transferring the first data determined by the second application according to the second input operation to the first application, instruct the output device 40 to display first information on the interface corresponding to the first application, where the first information is the first data or information related to the first data.

In another specific implementation manner, the processor 60 may be further configured to: after transferring the second data determined by the first application according to the third input operation to the second application, instruct the output device 40 to display second information on the interface corresponding to the second application, where the second information is the second data or information related to the second data.

Further, the processor 60 may be further configured to instruct, according to the preset correlation information when the first input operation is a second preset operation, the output device 40 to switch a currently displayed interface from the interface corresponding to the first application to the interface corresponding to the second application.

In a specific implementation manner, the first input operation is a first sliding operation; and instructing, by the processor 60 according to the preset correlation information when the first input operation is the first preset operation, the output device 40 to simultaneously display the interface corresponding to the first application and the interface corresponding to the second application is specifically: when a sliding speed or sliding distance corresponding to the first sliding operation is less than a first preset value, the processor 60 instructs, according to the preset correlation information, the output device 40 to simultaneously display the interface corresponding to the first application and the interface corresponding to the second application.

In another specific implementation manner, the sliding operation may include a second sliding operation, and the second preset operation may be the second sliding operation; and instructing, by the processor 60 according to the preset correlation information when the first input operation is the second preset operation, the output device 40 to switch a currently displayed interface from the interface corresponding to the first application to the interface corresponding to the second application is specifically: the processor 60 instructs, according to the preset correlation information when the first input operation is the second preset operation, the output device 40 to switch the currently displayed interface from the interface corresponding to the first application to the interface corresponding to the second application.

In still another specific implementation manner, the first input operation is the multi-touch operation; and instructing, by the processor 60 according to the preset correlation information when the first input operation is the first preset operation, the output device 40 to simultaneously display the interface corresponding to the first application and the interface corresponding to the second application is specifically: when a distance between touch points of the multiple touch points gradually decreases, and a decreased value of a distance between two touch points in the multiple touch points is greater than or equal to a first preset distance value, the processor 60 instructs, according to the preset correlation information, the output device 40 to simultaneously display the interface corresponding to the first application and the interface corresponding to the second application; or when a distance between touch points of the multiple touch points gradually increases, and an increased value of a distance between two touch points in the multiple touch points is greater than or equal to a second preset distance value, instructing, by the processor 60 according to the preset correlation information, the output device 40 to simultaneously display the interface corresponding to the first application and the interface corresponding to the second application.

In the foregoing embodiment, there may be multiple second applications; and instructing, by the processor 60 according to the preset correlation information when the first input operation is the first preset operation, the output device 40 to simultaneously display the interface corresponding to the first application and the interface corresponding to the second application is specifically: the processor 60 instructs, according to the preset correlation information when the first input operation is the first preset operation, the output device 40 to separately display, on the interface corresponding to the first application, an identifier corresponding to each second application in the multiple second applications; and after the input device 50 receives an operation of selecting, by the user, one or more identifiers from the multiple second applications, the processor 60 instructs the output device 40 to simultaneously display the interface corresponding to the first application and an interface corresponding to an application identified by the one or more identifiers.

The second application that correlates with the first application may be preset, or may be determined according to a history of using the first application and the second application by the user, or determined in another manner.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An electronic device, comprising:
   a touch screen;
   a non-transitory computer readable memory storing computer-executable program code; and
   a processor configured for executing the computer-executable program code to cause the electronic device to perform operations comprising:
      displaying a first interface corresponding to a photo gallery on a display of the touch screen;
      receiving a first input on the touch screen within the first interface;
      displaying, in response to the first input being a first preset input, a second interface corresponding to the photo gallery, and wherein the second interface is displayed together with a preview interface corresponding to a camera application on the display of the touch screen, wherein a ratio between the preview interface and the second interface on the display is a first value, wherein the first preset input is a sliding input, and wherein the second interface and the preview interface are arranged in a same direction as a direction of the sliding input;
      receiving a second input within the preview interface when the ratio is the first value;
      photographing, while displaying the second interface with the preview interface, a first picture by the camera application in response to the second input to get, after the photographing the first picture, the first picture with a first image size;
      receiving a third input while displaying the second interface with the preview interface;
      changing the ratio between the preview interface and the second interface to a second value in response to the third input and while displaying the second interface with the preview interface, wherein the second value is different from the first value;
      receiving a fourth input within the preview interface when the ratio is the second value and while displaying the second interface with the preview interface;
      photographing a second picture by the camera application, in response to the fourth input, when the ratio is the second value and while displaying the second interface with the preview interface, to get, after the photographing the second picture, the second picture with a second image size, wherein the second image size of the second picture is different from the first image size of the first picture;
   displaying, on the display of the touch screen and in response to a sixth input being received and being a second preset input different from the first preset input, the preview interface alone and with the first interface hidden such that the preview interface occupies whole interface of the display;
   receiving a fifth input within the preview interface when the preview interface occupies the whole interface of the display; and
   photographing a third picture by the camera application in response to the fifth input to get, after the photographing the third picture, the third picture with a third image size, wherein the third image size of the third picture is different from the first image size and the second image size.

2. The electronic device according to claim 1, wherein the operations further comprise displaying, in the second interface, first information wherein the first information is the first picture or a thumbnail image corresponding to the first picture.

3. The electronic device according to claim 1, wherein the first image size of the first picture is associated with the first value for the ratio between the preview interface and the second interface on the display before changing the ratio, and wherein the second image size of the second picture is associated with the second value for the ratio between the preview interface and the second interface on the display after changing the ratio.

4. The electronic device according to claim 1, wherein the displaying the second interface corresponding to the photo gallery together with the preview interface corresponding to a camera comprises displaying, in response to a speed of the sliding input falling within a set value range, the second interface together with the preview interface.

5. The electronic device according to claim 4, wherein the operations further comprise displaying the second interface corresponding to the photo gallery without the preview interface in response to the speed of the sliding input falling outside the set value range.

6. The electronic device according to claim 1, wherein the first image size corresponds to a first size of the preview interface while the ratio between the preview interface and the whole interface is the first value, and wherein the second imaged size corresponds to a second size of the preview interface while the ratio between the preview interface and the whole interface is the second value, and wherein the third image size corresponds to a third size of the preview interface while the preview interface is shown alone and with the preview interface hidden.

7. The electronic device according to claim 1, wherein the second preset input is a tap input in the first interface.

8. An electronic device, comprising:
a touch screen;
a processor;
a non-transitory computer readable memory storing computer-executable program code for execution by the processor, the program code including instructions for:
displaying a first interface of a photo gallery in a first area of a touch screen;
detecting a first input on the touch screen within the first interface;
displaying, in response to the first input being a first preset input, the first interface to fit in a second area together with a first preview interface of a camera application in a third area, wherein the first area comprises the second area and the third area, wherein a ratio between the first preview interface of the camera application in the third area and the first interface of the photo gallery in the second area is a first ratio, wherein the first preset input is a sliding input, and wherein the first interface and the first preview interface of the camera application are arranged in a same direction as a direction of the sliding input;
detecting a second input to the first preview interface of the camera application;
photographing, while displaying the first interface with the preview interface corresponding to a camera application, a first picture by the camera in response to the second input to get, after the photographing the first picture, the first picture with a first image size while the ratio between the preview interface and the first interface is the first ratio;
receiving a third input while displaying the first interface with the first preview interface corresponding to the camera application;
displaying, in response to the third input, a second preview interface together with the first interface, wherein a ratio between the second preview interface and the first interface is a second ratio different from the first ratio, detecting a fourth input to the second preview interface of the camera while displaying the second preview interface together with the first interface;
photographing a second picture by the camera in response to the fourth input to get, after the photographing the second picture, the second picture with a second image size while the ratio between the second preview interface and the first interface is the second ratio and while displaying the second preview interface together with the first interface, wherein the second image size is different from the first image size;
displaying, on the display of the touch screen and in response to a sixth input being received and being a second preset input different from the first preset input, a third preview interface alone and with the first interface hidden such that the preview interface occupies whole interface of the display;
receiving a fifth input within the third preview interface when the third interface occupies the whole interface of the display; and
photographing a third picture by the camera application in response to the fifth input, to get, after the photographing the third picture, the third picture with a third image size, wherein the third image size of the third picture is different from the first image size and the second image size.

9. The electronic device according to claim 8, wherein the program code further includes instructions for displaying, after the photographing the first picture, first information on the first interface, wherein the first information is a thumbnail image corresponding to the first picture.

10. The electronic device according to claim 8, wherein the first image size of the first picture is associated with the first ratio, and wherein the second image size of the second picture is associated with the second ratio.

11. The electronic device according to claim 8, wherein the instructions for displaying the first interface of the photo gallery together with the preview interface include instructions for displaying, in response to a speed of the sliding input falling within a set value range, the first interface together with the preview interface.

12. The electronic device according to claim 11, wherein the program code further includes instructions for displaying the first interface corresponding to the photo gallery without the preview interface in response to the speed of the sliding input falling outside the set value range.

13. A non-transitory computer-readable medium storing a program causing an electronic device to execute a process, the process comprising:
displaying a first interface corresponding to a photo gallery on a display of a touch screen;
receiving a first input on the touch screen within the first interface;
displaying, in response to the first input being a first preset input, a second interface corresponding to the photo gallery together with a preview interface corresponding to a camera application on the display of the touch screen, wherein a ratio between the preview interface and a second interface on the display is a first value, wherein the first preset input is a sliding input, and wherein the second interface and the preview interface are arranged in a same direction as a direction of the sliding input;
receiving a second input within the preview interface when the ratio is the first value;
photographing, while displaying the second interface with the preview interface, a first picture by the camera application in response to the second input to get, after the photographing the first picture, the first picture with a first image size;
receiving a third input while displaying the second interface with the preview interface corresponding to a camera application;

changing the ratio between the preview interface and the second interface to a second value in response to the third input and while displaying the second interface with the preview interface, wherein the second value is different from the first value;

receiving a fourth input within the preview interface when the ratio is the second value and while displaying the second interface with the preview interface corresponding to the camera application;

photographing a second picture by the camera application in response to the fourth input, while the ratio between the preview interface and the second interface is the second value and while displaying the second interface with the preview interface corresponding to a camera application, to get, after the photographing the second picture, the second picture with a second image size, wherein the second image size of the second picture is different from the first image size of the first picture;

displaying, on the display of the touch screen and in response to a sixth input being received and being a second preset input different from the first preset input, the preview interface corresponding to a camera application alone and with the first interface hidden such that the preview interface occupies whole interface of the display;

receiving a fifth input within the preview interface when the preview interface occupies the whole interface of the display; and photographing a third picture by the camera application in response to the fifth input to get, after the photographing the third picture, the third picture with a third image size, wherein the third image size of the third picture is different from the first image size and the second image size.

14. The non-transitory computer-readable medium according to claim 13, wherein the first image size of the first picture is associated with the first value for the ratio between the preview interface and the whole interface on the display before changing the ratio, and wherein the second image size of the second picture is associated with the second value for the ratio between the preview interface and the whole interface on the display after changing the ratio.

15. The non-transitory computer-readable medium according to claim 13, wherein the first input is a sliding touch input.

16. The non-transitory computer-readable medium according to claim 15, wherein the displaying the second interface corresponding to the photo gallery together with the preview interface corresponding to a camera comprises displaying, in response to a speed of the sliding touch input falling within a set value range, the second interface together with the preview interface.

17. The non-transitory computer-readable medium according to claim 16, wherein the process further includes displaying the second interface corresponding to the photo gallery without the preview interface in response to the speed of the sliding touch input falling outside the set value range.

\* \* \* \* \*